Oct. 29, 1957 J. DREXLER 2,811,695
AUTOMATIC LEVEL CONTROL
Filed Oct. 18, 1954 2 Sheets-Sheet 1

INVENTOR
J. DREXLER
BY Hugh S. Wertz
ATTORNEY

United States Patent Office 2,811,695
Patented Oct. 29, 1957

2,811,695

AUTOMATIC LEVEL CONTROL

Jerome Drexler, Irvington, N. J., assignor to Bell Telephone Laboratories, Incorporated, New York, N. Y., a corporation of New York Application October 18, 1954, Serial No. 462,953

9 Claims. (Cl. 333—17)

This invention relates to automatic level control systems and more specifically to variable loss equalizers and variable attenuators using four-pole constant resistance networks.

Automatic level control systems are known for regulating the output level of electronic apparatus whereby undesirable variations thereof are inhibited. One type of level control is the loss equalizer network such as described in United States Patent 2,096,027 of October 19, 1937, to H. W. Bode wherein the attenuation introduced by the equalizer changes with frequency. Another more common type of level control is the attenuator network wherein attenuation introduced is constant over a frequency band. To achieve control, undesirable variations in the output of a network are utilized to vary the impedance of the elements therein and thereby vary the attenuation characteristic of the network to maintain a predetermined output level. It is also desirable that these networks should have a constant input and/or output impedance to provide a match with the circuits to which the networks are connected. It is generally true that a variation in the attenuation of the network also varies the input and/or output impedances of the network. However, variable attenuation networks which also provide good impedance matching with connected circuits have been achieved heretofore either through the use of manual adjusting equipment or complex and bulky automatic adjustment equipment.

It is an object of this invention to provide an improved and simplified variable attenuation circuit having a constant input and/or output impedance.

The variable attenuator circuit which is the principal feature of this invention comprises a four-pole constant resistance network of a type including two resistances of which the product of the values of the two resistors is a constant. In accordance with the invention, the two resistors are made to be variable, having exponential current-resistance characteristics, and a source of constant direct current is connected to the network to provide a distributed current flow through the resistors. The direct current flow establishes the input and/or the output impedances of the network substantially constant within a given attenuation range, and by further controlling the distribution of this constant direct current between the resistors, the attenuation level of the network can be altered.

The advantage of this arrangement is that, within limits, the input and/or output resistances of the network are substantially constant and the attenuation level of the network is made variable simply by controlling the direct current flow through resistance arms of the network.

The invention, its objects and advantages will be better understood by referring to the following disclosure in which drawings comprise a part thereof, wherein.

Figure 1:
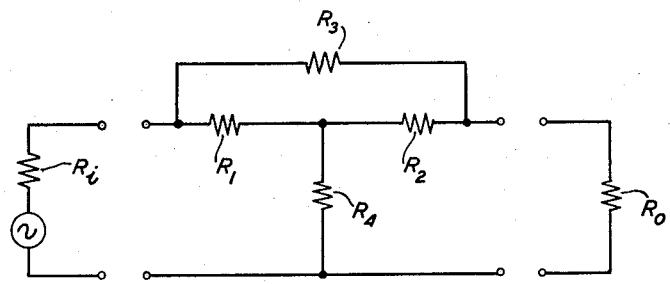
Fig. 1 is a schematic circuit useful in describing the principles of the invention.

Referring to the drawings there is shown in Fig. 1, for purposes of explaining, by way of example, the principles of operation of the invention, a bridged-T network which is in the class of the type described above.

In bridged-T network of Fig. 1 the resistances $R_1$ and $R_2$ form the two series arms, the resistance $R_3$, in shunt across the series arm, forms the bridging arm, and the resistance $R_4$ the shunt arm. The effective resistances of the input source and output load are designated $R_i$ and $R_0$, respectively.

It is known that in a resistance type bridged-T network $$R_i = R_1 = R_2 = R_0 = R \tag{1}$$

where R is a constant. As pointed out above the input and output resistances of the network can be made to remain constant whenever $$R_3 R_4 = R^2 \tag{2}$$

The insertion voltage ratio, $e^\theta$ (where e is the base of the natural logarithms and $\theta$ is attenuation in nepers) of this network may be expressed as $$e^\theta = \frac{2(R_3+R)(R_4+R)}{R_3 R_4 + 2 R_4 R + R^2} \tag{3}$$

From Equation 3 it can be seen that the attenuation of the network can be varied by varying the values of $R_3$, $R_4$ or R. But if the input and output resistances of the network are to remain constant at the same time the values of $R_3$ and $R_4$ must be varied simultaneously and in accordance with the inverse relationship shown in Equation 2. This is but an illustrative statement of the problem common to all four-pole networks of the type defined. In the past this problem has been overcome in bridged-T networks by manually adjusting the values of the resistors or as shown in United States Patent 2,660,625, issued November 24, 1953, to C. W. Harrison through the use of elaborate control equipment.

Figure 4:
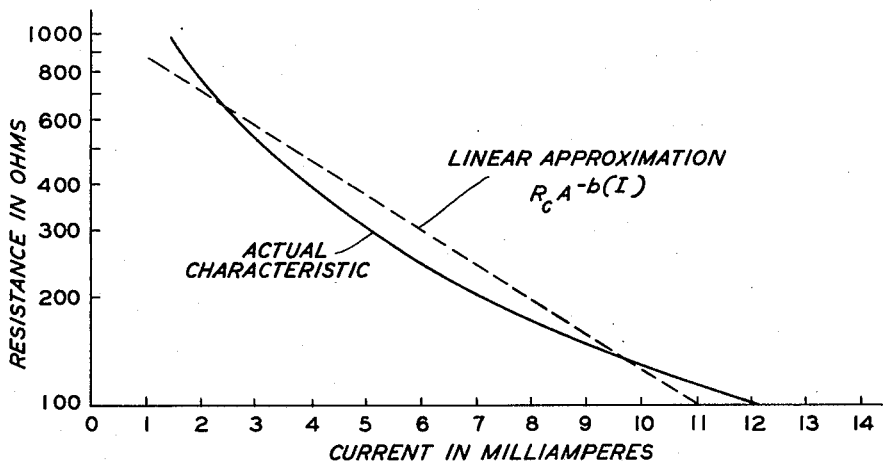
Fig. 4 is a chart on a semi-log scale showing resistance-current characteristics of a thermistor suitable for use in the circuit of Fig. 2.

It has been discovered that by using resistance devices having exponential current-resistance characteristics, such as for example, thermistors, as the defined resistors of the general case (the bridge and shunt arms resistances in the illustrative bridged-T network of Fig. 1), in conjunction with a constant direct current supply connected to the network, the input and/or output resistances of the network will be substantially constant over a range of input signals and attenuation levels without the aid of control devices. The discovery can be explained by defining the constant direct current I as $$I = I_1 + I_2 \tag{4}$$

when $I_1$ and $I_2$ are the respective current flows through resistors $R_3$ and $R_4$. As $R_3$ and $R_4$ are resistances, such as thermistors, having exponential current-resistance relationships as shown in Fig. 4, the resistance of each may be expresed by the functions $$R_c A^{-b(I_1)} = R_3 \text{ and } R_c A^{-b(I_2)} = R_4 \tag{5}$$

where $R_c$, A and b are positive constants. It is obvious from Equations 4 and 5 that $I_1$ and $I_2$ are complements of one another and that $R_3$ and $R_4$ are direct functions of $I_1$ and $I_2$ respectively; therefore, the resistance values of $R_3$ and $R_4$ vary inversely. This is shown by substituting the values of Equations 5 into Equation 2 whereby $$R_c A^{-b(I_1)} \times R_c A^{-b(I_2)} = R^2 \qquad (6)$$

This equation may be rewritten as $$R_c^2 A^{-b(I_1+I_2)} = R_c^2 A^{-b(I)} = R^2 \qquad (7)$$

Thus, by using thermistors, $R_3$ and $R_4$ can be made to vary inversely in resistance values thereby inserting variable attenuation and from Equation 7 fulfilling the conditions for maintaining the input and output impedances constant.

Figure 2:
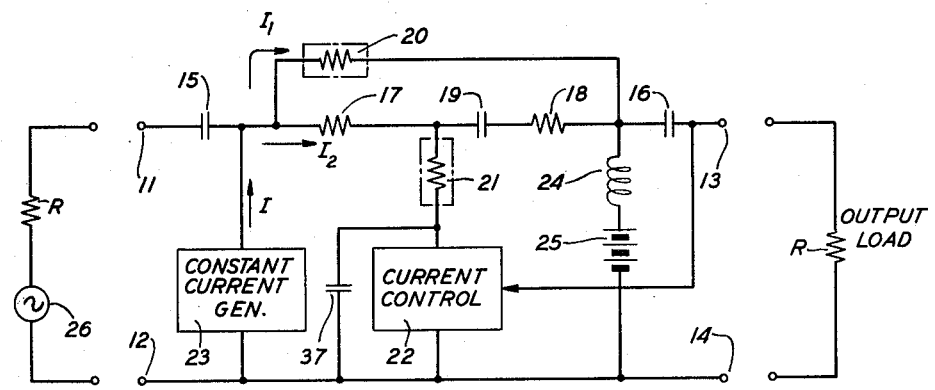
Fig. 2 shows in schematic form a bridged-T type automatic level control circuit in accordance with the invention.

A specific circuit utilizing this discovery and illustrating the principles of the invention is shown in schematic form in Fig. 2. Therein a bridged-T network having input terminals 11 and 12 and output terminals 13 and 14 is provided with a signal input through direct current blocking capacitor 15. A direct current blocking capacitor 16 is also connected to the output terminal 13. In the bridged-T network the series arm resistances 17 and 18 are connected by a direct current blocking capacitor 19 and are bridged by a resistance 20 having an exponential characteristic. The exponential shunt arm resistance 21 is connected between the junction of resistance 17 and capacitor 19 to terminals 12 and 14 through a current control device 22 which is shunted by a by-pass capacitor 37. A constant direct current is supplied to the circuit by generator 23 including an alternating current choke coil (not shown) connected between terminal 12 and the junction of capacitor 15 and resistance 17. The direct current path is completed by an alternating current choke coil 24 and battery 25 connected in series between terminal 14 and the junction of resistance 18 and capacitor 16. A constant direct current I from generator 23 is divided into two components; one component, as represented by the current $I_1$, flows through resistance 20 and choke coil 24 to battery 25, and the other component, as represented by the current $I_2$, flows through resistance 17, resistance 21 and current control device 22. This distributed current flow determines the instantaneous resistance values of the particular thermistor elements 20 and 21, thereby establishing the input and output impedances of the network constant, as described above, while still providing flexible means for controlling the attenuation of the circuit. Thus, any signal level variation from source 26 having an internal resistance R applied to the attenuator appears at the output terminal 13 and is fed back to the current control device 22. If the output level at 13 should increase, the current control device 22 is operated in a manner to increase the current flow $I_2$ through resistance 21, thereby lowering its resistance and decreasing the current flow $I_1$ through resistance 20 which increases its resistance and the attenuation inserted by the network. Should the output level decrease, the current control device reduces the current flow $I_2$, thereby increasing the current flow $I_1$, decreasing the resistance 20 and reducing the signal attenuation inserted by the network. If the signal current is small as compared to the constant direct current, the input and output resistances of the network will remain substantially constant over a given range of attenuation levels.

Figure 3A:
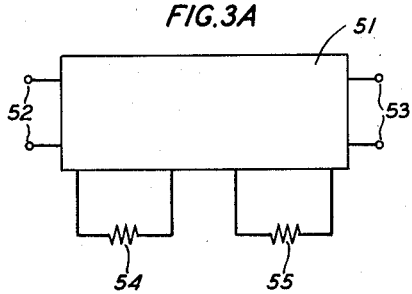
Figs. 3A and 3B show in block schematic form four-pole constant resistance networks illustrating the principles of the invention.
Figure 3B:
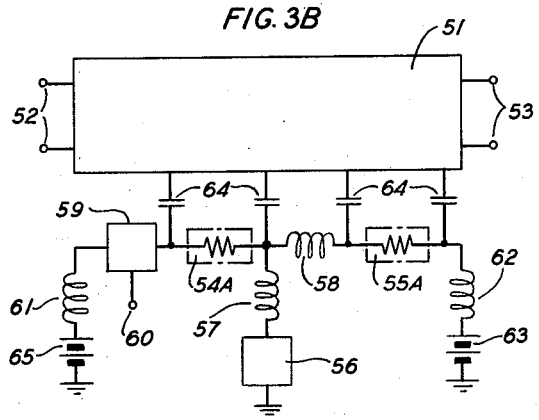

Although the foregoing alternative examples of the principles of the invention have been directed to bridged-T networks, it is obvious that these principles will also apply to any four-pole constant resistance network including two resistors in which the input and/or the output resistances of the network are constant when the product of the values of the two resistors in the network is constant. Thus in Fig. 3A there is shown in block schematic form such a four-pole network 51 having an input terminal pair 52 and an output terminal pair 53 and in which resistors 54 and 55 are integral parts of the network. This network may be modified in accordance with the principles of the invention as shown in Fig. 3B. Therein the resistors 54 and 55 have been replaced by resistance devices 54A and 55A having exponential resistance-current characteristics, such as thermistors, and direct current from a constant current generator 56 is fed to device 54A through choke coil 57 and to device 55A through the additional choke coil 58. The direct current path through 54A is completed through current control device 59, having a control terminal 60, and choke coil 61 to potential source 65. The direct current path through 55A is completed through choke coil 62 and potential source 63 to ground. In order not to interfere with the alternating current operation of the network, the resistances 54A and 54B are now coupled to the network through capacitors 64. The difference in the values of potential sources 63 and 65 must be approximately equal to the product of the constant current from generator 56 and the lowest value of the internal resistance of the current control device 59. The lowest internal resistance of device 59 must be large compared to the sum of the resistances of devices 54A and 55A. Depending upon the actual circuit relationships between devices 54A and 55A in the network, it is obvious that in some circumstances some of the alternating current and direct current blocking devices might be found to be unnecessary and eliminated. The circuit of Fig. 3B is therefore seen to be analogous to the circuit of Fig. 2.

Figure 5:
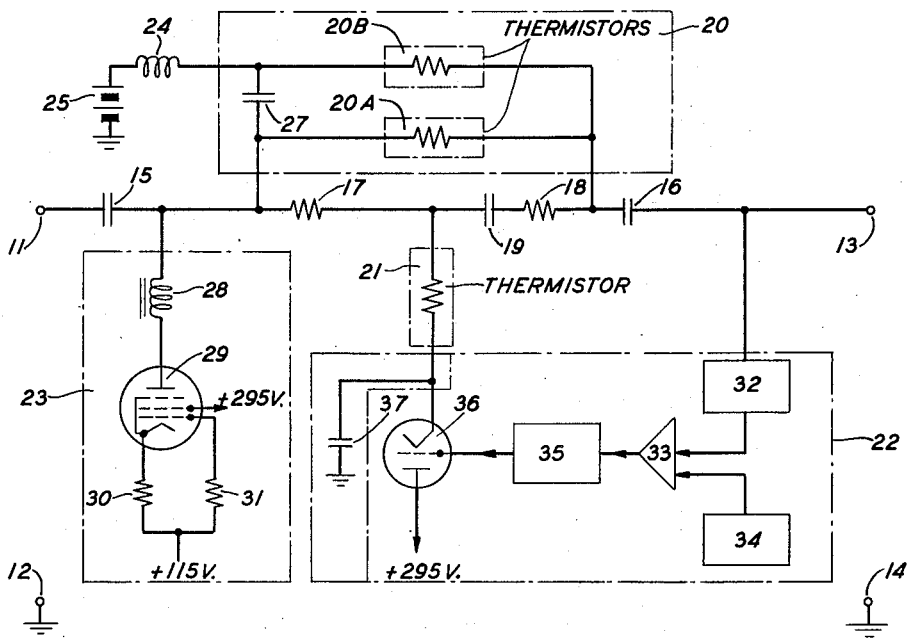
Fig. 5 shows in schematic form a complete automatic volume control system in accordance with the invention using a variable attenuator as shown in Fig. 2.

An automatic volume control system such as used in actual practice and including the attenuator network in accordance with the invention is shown in Fig. 5. Therein the resistance 20 is represented by two thermistor elements 20A and 20B which are connected in direct current series and alternating current parallel by capacitor 27 and across the series arm resistances 17 and 18. By this arrangement the resistance ranges of the shunt arm and bridge arm thermistors are made substantially equal without introducing any operational changes in the network. This equalization of the resistance ranges of the thermistors results in smaller input and output impedance variations for a given attenuation range. The constant current generator 23 in Fig. 5 comprises the alternating current choke coil 28 connected to the plate of a vacuum tube 29, the cathode and control grid of which is connected to a biasing potential through resistors 30 and 31 respectively. The screen grid is connected to a potential source as indicated. The current control means 22 includes an envelope detector 32, the difference amplifier 33 connected to the envelope detector 32 and a voltage reference source 34. The output of amplifier 33 is supplied to a direct current amplifying stage 35 which in turn is connected to the grid of a control tube 36. The thermistor 21 is connected to the cathode of control tube 36 and to ground potential through by-pass capacitor 37, and the plate of tube 36 is connected to a positive potential source. The envelope detector is of a type such as that disclosed in Fig. 25a, page 554 of Terman's Radio Engineers Handbook and the difference amplifier, voltage reference source and direct current amplifier are substantially identical to the regulation circuit in the drawing of application Serial No. 253,657, filed October 29, 1951, by F. F. Merriam, now Patent No. 2,753,509, issued July 3, 1956, as represented by tubes $V_5$, $V_6$, $V_7$ and their associated circuitry therein.

The foregoing principles of operation are particularly applicable where the ambient temperature of the network is constant. As the resistance characteristics of thermistors vary with changes of current flow therethrough so also do they vary with changes in ambient temperature, the latter of which is undesirable in circuitry of the invention. This objectionable variation may be compensated for by making appropriate adjustments in the direct current flow I through the thermistor.

The required value of the adjusted current I may be obtained, for example, by applying a temperature dependent bias to the control grid of the constant current generator tube 29.

An automatic volume control as shown in Fig. 5 as constructed and operated in actual practice provided attenuation range of 25 db for an input signal not greater than .6 volt R. M. S. and an input and output resistance of 220 ohms having a maximum variation of ±8 percent. While any number of circuit values may be used in such an arrangement, the values used in the circuit as shown in Fig. 5, which was designed to operate at 1000 cycles per second, are:

15—8 microfarads
16—8 microfarads
17—220 ohms
18—220 ohms
19—8 microfarads
20A—28A thermistor (Western Electric)
20B—28A thermistor (Western Electric)
21—28A thermistor (Western Electric)
24—4 henrys
25—190 volts
27—8 microfarads
28—8 henrys
29—6AQ5
30—470,000 ohms
31—680 ohms
36—396A (Western Electric)
37—8 microfarads It is understood that the above-described embodiments are merely illustrative of the principles of the invention and that many variations thereof, including any network in which the product of two variable resistances is to be maintained constant, might be devised by those skilled in the art without departing from the spirit and scope of the invention.

What is claimed is:

1. A variable attenuator comprising a bridged-T network including a variable impedance bridge arm and a variable impedance shunt arm, said variable impedances having exponential current-impedance characteristics, means for connecting a signal source to said network, means for connecting an output load to said network, means for applying a substantially constant direct current to said network for distributed flow through said bridge and shunt arms to establish the input and output impedances of said network substantially constant, and means to distribute the direct current flow between said bridge and shunt arms in accordance with variations in the output for controlling the attenuation of said network.

2. A variable attenuator comprising a bridged-T network including two impedance series arms, a variable impedance bridge arm and a variable impedance shunt arm, said variable impedances being thermistors having exponential current-resistance characteristics, means for connecting a signal source to said network, means for connecting an output load to said network, a source of substantially constant direct current connected to said network to supply distributed current flow through said bridge and shunt arms for establishing the input and output impedances of said network substantially constant, and means connected in series with said shunt arm to distribute the direct current flow between said bridge and shunt arms in accordance with variations in the output for controlling the attenuation of said network.

3. A variable attenuator comprising a bridged-T network including a pair of input terminals and a pair of output terminals, two resistance series arms connecting one of said input terminals to one of said output terminals, a variable resistance bridge arm connected across said series arms and a variable resistance shunt arm connected to the junction of said series arms, said variable resistances being thermistors having exponential current-resistance characteristics, a source of constant direct current connected to the junction of said bridge arm and series arms at said input terminal to provide for a distributed current flow through said bridge and shunt arms for establishing the input and output resistances of said network substantially constant, means connected between said shunt arm and the other of said input and output terminals to control direct current flow through said shunt arm, and means connected between said control means and said one output terminal to change said direct current flow in accordance with variations in the output of said network whereby the attenuation of said network is changed and the signal output level remains substantially constant.

4. A four-pole constant resistance network including a pair of variable resistance devices, said devices having exponential current-resistance characteristics and the product of the resistance values being constant, means for connecting a signal source to said network, means for connecting an output load to said network, means for applying a substantially constant direct current to said network for distributed flow through said pair of devices to establish the input and output resistances of the network substantially constant, and means to distribute the direct current flow between said devices in accordance with variations in the output for controlling the attenuation of said network.

5. A bridged-T network including two constant resistance series arms, a variable resistance bridge arm including a pair of variable resistances connected in direct current series and alternating current parallel, a variable resistance shunt arm, said variable resistances being thermistors having exponential current-resistance characteristics, means for connecting a signal source to said network, means for connecting an output load to said network, and means for applying a substantially constant direct current to said network for distributed current flow through said bridge and shunt arms to establish the input and output resistances of said network substantially constant.

6. The bridged-T network of claim 5 in further combination with an additional source of direct current, and means for varying the output thereof in accordance with ambient temperature variations.

7. A variable attenuator in accordance with claim 1 wherein said variable impedance bridge arm includes a pair of thermistors connected in direct current series and alternating current parallel.

8. A variable attenuator according to claim 1 in further combination with means for varying said distribution means in accordance with ambient temperature variations.

9. A variable attenuator in accordance with claim 3 in further combination with means for varying said control means in accordance with ambient temperature variations.

References Cited in the file of this patent

UNITED STATES PATENTS

| 2,182,329 | Wheeler | Dec. 5, 1939 |
| 2,345,066 | Nylund | Mar. 28, 1944 |
| 2,462,551 | Renner | Feb. 22, 1949 |
| 2,660,625 | Harrison | Nov. 24, 1953 |

FOREIGN PATENTS

| 514,614 | Great Britain | 1939 |